(12) United States Patent
Barker (10) Patent No.: US 12,457,914 B2
(45) Date of Patent: Nov. 4, 2025

(54) CROP FEELER DEVICE FOR MACHINE ROW GUIDANCE

(71) Applicant: Deere & Company, Moline, IL (US)

(72) Inventor: Mark E. Barker, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 318 days.

(21) Appl. No.: 18/344,950

(22) Filed: Jun. 30, 2023

(65) Prior Publication Data
US 2025/0000006 A1    Jan. 2, 2025

(51) Int. Cl.
*A01B 69/04* (2006.01)
*A01D 41/127* (2006.01)
*B62D 6/00* (2006.01)

(52) U.S. Cl.
CPC ........ *A01B 69/008* (2013.01); *A01D 41/1278* (2013.01); *B62D 6/001* (2013.01)

(58) Field of Classification Search
CPC ... A01B 69/008; A01D 41/1278; B62D 6/001
See application file for complete search history.

(56) References Cited

U.S. PATENT DOCUMENTS

| | | | | |
|---|---|---|---|---|
| 3,742,689 A | * | 7/1973 | Barows | A01D 57/00 56/226 |
| 4,505,094 A | * | 3/1985 | Demorest | A01B 69/008 180/401 |
| 4,528,804 A | * | 7/1985 | Williams | A01B 69/008 180/401 |
| 4,663,918 A | * | 5/1987 | Williams | A01B 69/008 56/DIG. 15 |
| 5,307,611 A | * | 5/1994 | Vardeman | A01D 41/1278 56/DIG. 15 |
| 6,959,527 B2 | * | 11/2005 | De Mendon Fava | A01D 46/28 56/328.1 |
| 7,055,616 B1 | * | 6/2006 | Kiel | A01B 39/22 701/50 |
| 7,310,931 B2 | * | 12/2007 | Gramm | A01D 41/14 56/208 |

(Continued)

FOREIGN PATENT DOCUMENTS

| | | |
|---|---|---|
| DE | DD 66518 A1 | 4/1969 |
| DE | 3013338 A1 | 12/1980 |

(Continued)

OTHER PUBLICATIONS

Geng et al., A. Development and Testing of Automatic Row Alignment System for Corn Harvesters, Google Scholar, MDPI, Applied Sciences 2022, Jun. 2022, pp. 1-18. (Year: 2022).*

(Continued)

*Primary Examiner* — Russell Frejd (57) ABSTRACT

A crop feeler device comprising a rod. A pivot device is coupled to the rod. The pivot device is configured to pivot in two opposing directions. A housing is rotatably coupled to the pivot device. A pair of torsion devices is positioned colinearly on the pivot device. The torsion devices are configured to return the rod to a central position after a pivot of the pivot device. A rotary sensor is positioned to measure a rotation of the pivot device or the rod as the rod moves from the central position.

18 Claims, 10 Drawing Sheets

(56) References Cited

U.S. PATENT DOCUMENTS

| | | | |
|---|---|---|---|
| 8,201,388 B1* | 6/2012 | Vandeven | A01D 41/141 |
| | | | 56/10.2 E |
| 9,936,637 B2 | 4/2018 | Anderson et al. | |
| 2016/0106023 A1 | 4/2016 | Roy | |
| 2018/0373259 A1* | 12/2018 | Aberle | B62D 1/28 |
| 2021/0321602 A1 | 10/2021 | Mcmenamy | |
| 2022/0304228 A1* | 9/2022 | Hunt | A01D 41/141 |
| 2022/0317688 A1* | 10/2022 | Li | B60K 35/80 |
| 2024/0040946 A1* | 2/2024 | Katti | A01D 41/1278 |

FOREIGN PATENT DOCUMENTS

| | | |
|---|---|---|
| DE | DD 294158 B5 | 4/1994 |
| EP | 2782438 B1 | 6/2017 |
| EP | 3424288 B1 | 1/2022 |

OTHER PUBLICATIONS

German Search Report issued in application No. 102024111821.0 dated Jan. 14, 2025, 09 pages.
German Search Report issued in application No. 102024114249.9 dated Jan. 31, 2025, 06 pages.

* cited by examiner

CROP FEELER DEVICE FOR MACHINE ROW GUIDANCE

FIELD OF THE DISCLOSURE

The present disclosure generally relates to machine row guidance and more particularly to a device and method for sensing a crop for crop row guidance for an agricultural work vehicle or machine.

BACKGROUND OF THE DISCLOSURE

In order to maintain an agricultural work vehicle in a series of crop rows, an operator commonly has to manually steer the work vehicle or a crop feeler device can be used that outputs a non-linear signal that is interpreted to provide a steering signal to help steer the work vehicle.

SUMMARY OF THE DISCLOSURE

In one embodiment, a crop feeler device is disclosed. The crop feeler device comprises a rod. A pivot device is coupled to the rod. The pivot device is configured to pivot in two opposing directions. A housing is rotatably coupled to the pivot device. A pair of torsion devices are positioned colinearly on the pivot device. The torsion devices are configured to return the rod to a central position after a pivot of the pivot device. A rotary sensor is positioned to measure a rotation of the pivot device or the rod as the rod moves from the central position.

In another embodiment, an agricultural work vehicle is disclosed. The agricultural work vehicle comprises a steering device configured to steer the agricultural work vehicle. A crop feeler device comprises a rod. A pivot device is coupled to the rod. The pivot device is configured to pivot in two opposing directions. A housing is rotatably coupled to the pivot device. A pair of torsion devices is positioned colinearly on the pivot device. The torsion devices are configured to return the rod to a central position after a pivot of the pivot device. A rotary sensor is positioned to measure a rotation of the pivot device or the rod as the rod moves from the central position. A controller is communicatively coupled to the rotary sensor. The controller comprises a data storage device and an electronic data processor. The data storage device is configured for storing instructions that are executable by the electronic data processor to cause the electronic data processor to receive the signal, determine a steering output, and provide a steering signal to the steering device to steer the agricultural work vehicle.

In yet another embodiment, a method for controlling an agricultural work vehicle is disclosed. The agricultural work vehicle comprises a steering device configured to steer the agricultural work vehicle. The method comprises providing a crop feeler device comprising a rod configured to contact a crop, a pivot device coupled to the rod, the pivot device configured to pivot in two opposing directions, a housing rotatably coupled to the pivot device, a pair of torsion devices positioned colinearly on the pivot device, the torsion devices configured to return the rod to a central position after a pivot of the pivot device, and a rotary sensor positioned to measure a rotation of the pivot device or the rod as the rod moves from the central position and provide a signal. The method further comprises receiving the signal, determining a steering output, and providing a steering signal to the steering device to steer the agricultural work vehicle.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
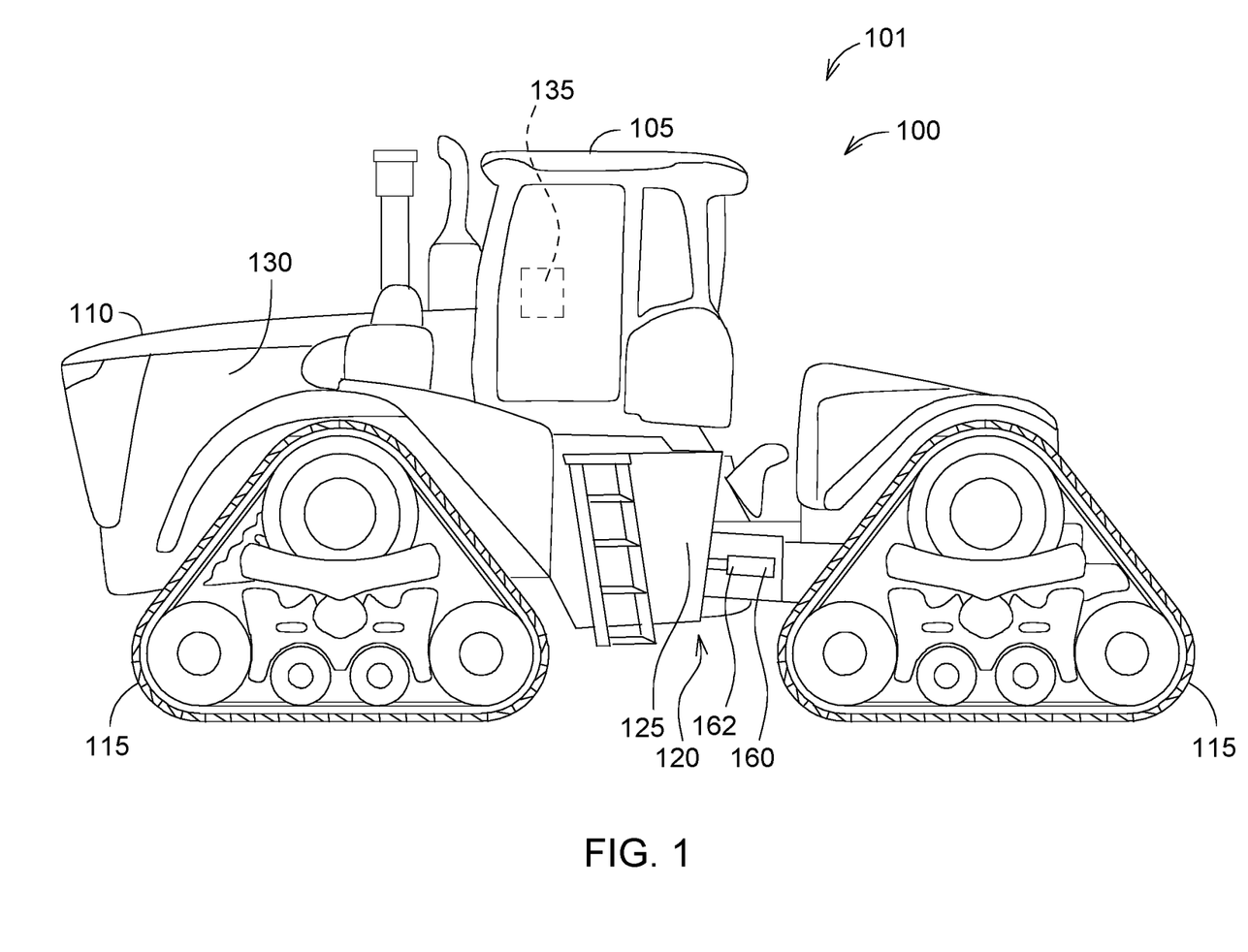
FIG. 1 is a side view of an agricultural work vehicle according to one embodiment.
Figure 4:
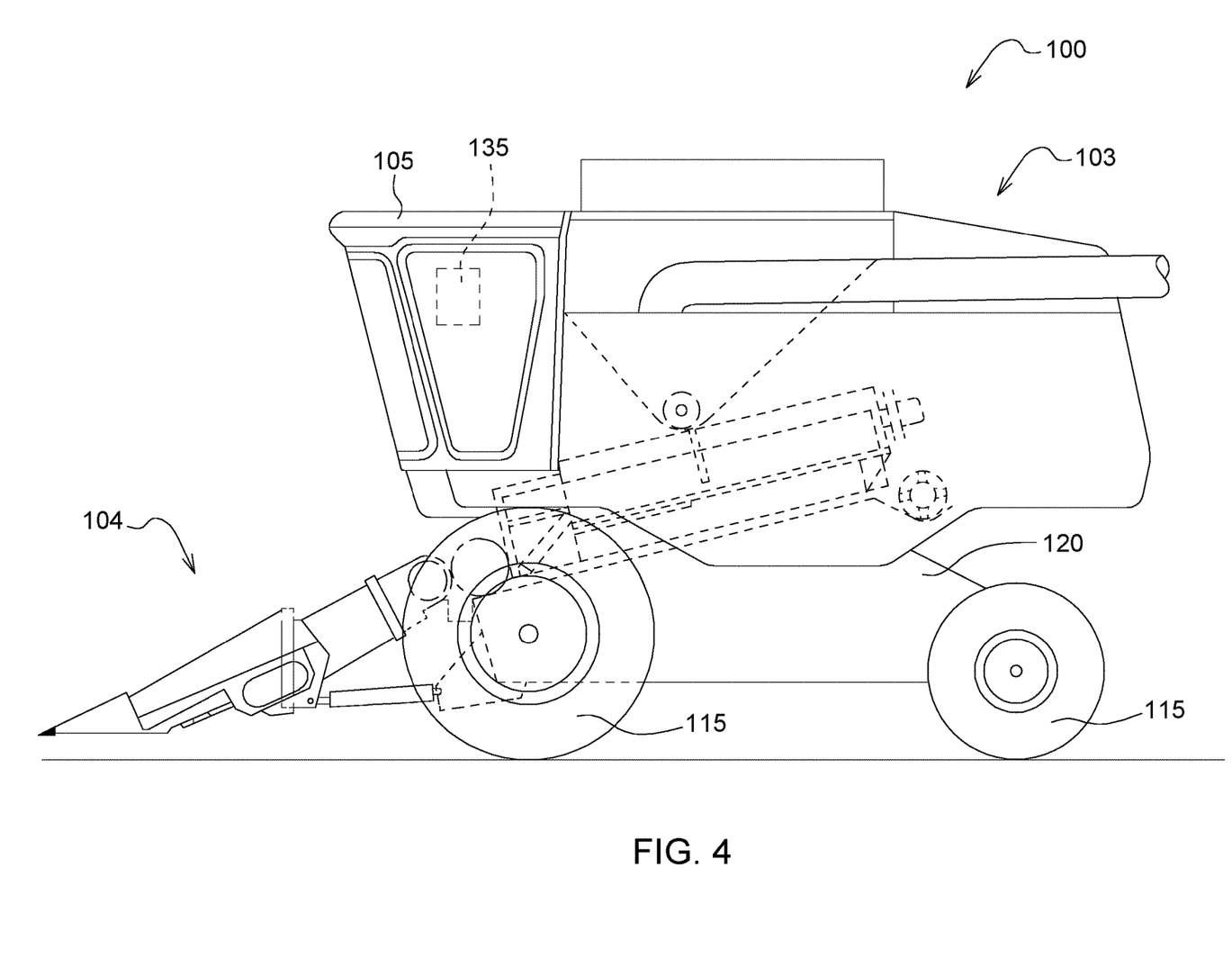
FIG. 4 is a side view of an agricultural work vehicle according to yet another embodiment.

FIG. 1 illustrates an agricultural work vehicle 100, for example a tractor 101. This disclosure also contemplates that the agricultural work vehicle 100 can include an agricultural sprayer 102 (FIG. 2) or a combine harvester 103 (FIG. 4) with a header 104 (FIG. 5) 10 or other agricultural work vehicle 100. The agricultural work vehicle 100 can include an operator station or cab 105, a hood 110, one or more ground engaging apparatus 115, for example wheels or track assemblies, and a frame or chassis 120. The agricultural work vehicle 100 can have a rigid or an articulated frame 125. The agricultural work vehicle 100 can include one or more power sources 130, for example an internal combustion engine, a hybrid engine, or an electric or hydraulic motor. The agricultural work vehicle 100 can include an operator interface 135 having any number and combination of electronic devices, such as an interactive display for providing and receiving information and instructions to and from an operator. The agricultural work vehicle 100 can include a suspension system.

Figure 2:
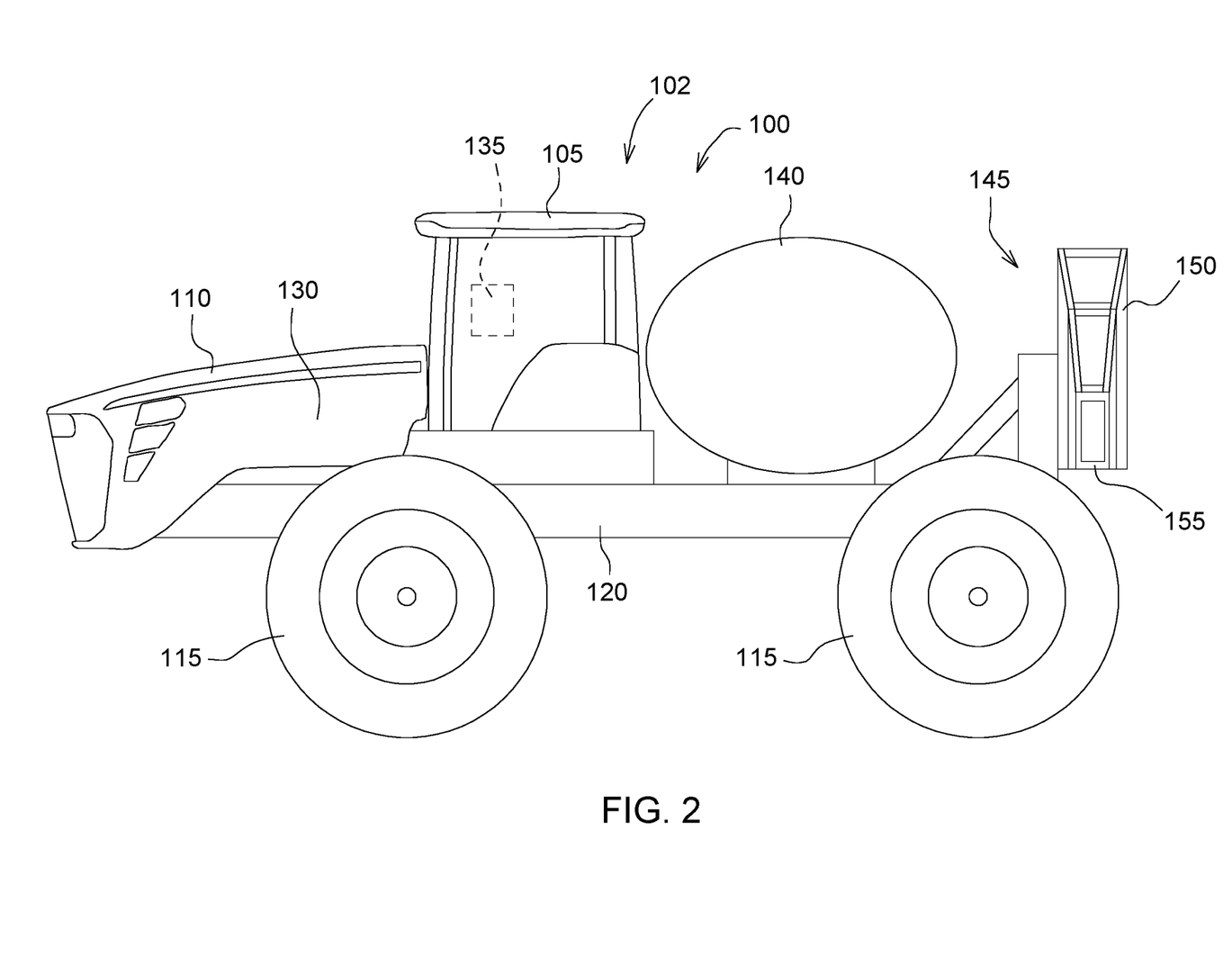
FIG. 2 is a side view of an agricultural work vehicle according to another embodiment.

With regards to FIG. 2, the illustrated agricultural work vehicle 100 or agricultural sprayer 102 includes a tank 140 for storing a treatment (e.g., chemical) to be dispensed and a set of booms 145 for supporting one or more spray nozzles. Each boom 145 includes an inner boom portion 150 and an outer boom portion 155.

The agricultural work vehicle 100 can include a steering device 160 (FIG. 1) configured to steer the agricultural work vehicle 100. The steering device 160 can include a hydraulic cylinder 162 or other actuator.

Figure 3:
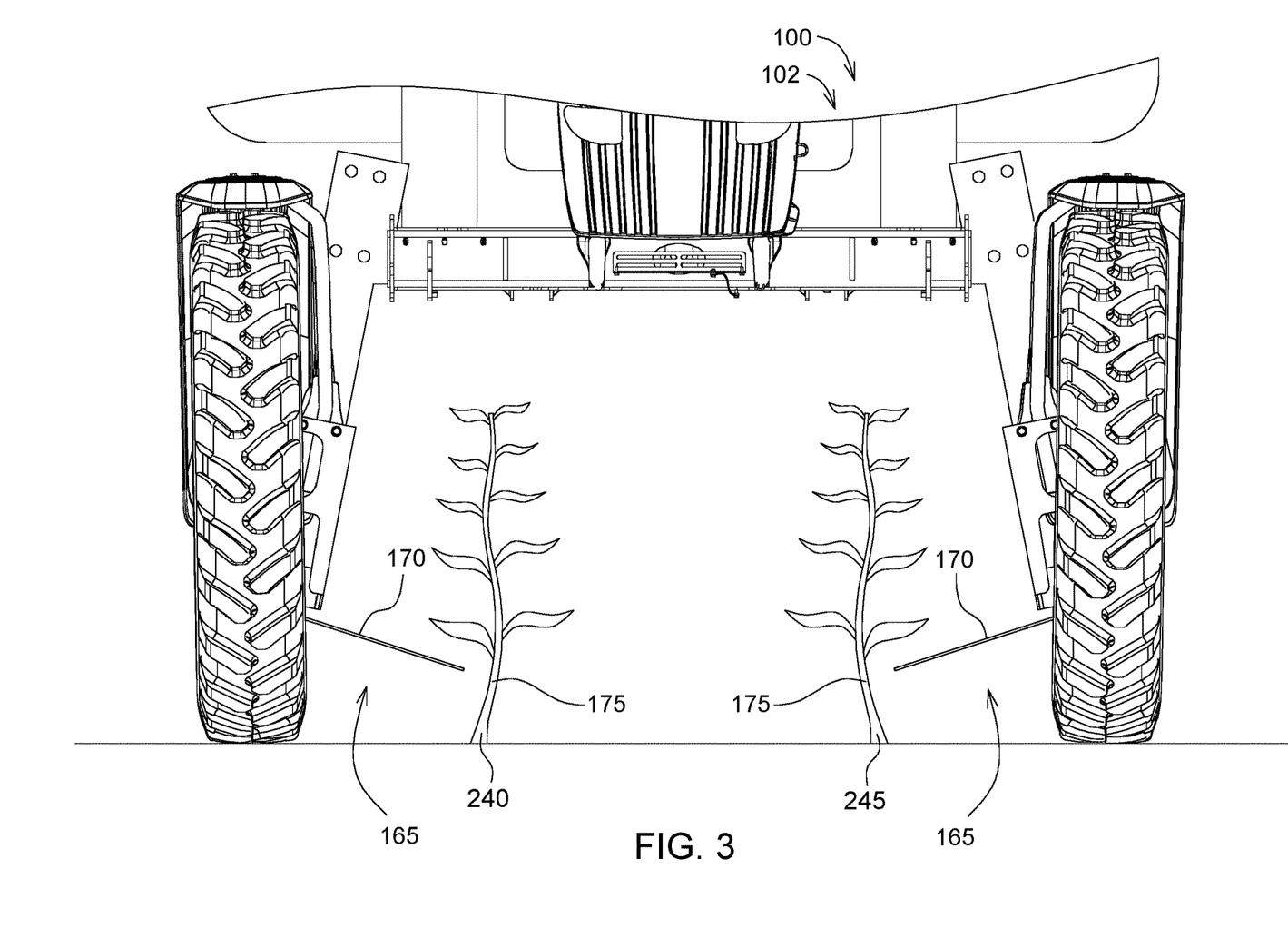
FIG. 3 is a partial front view of an agricultural work vehicle comprising a crop feeler device according to the embodiment of FIG. 2.
Figure 5:
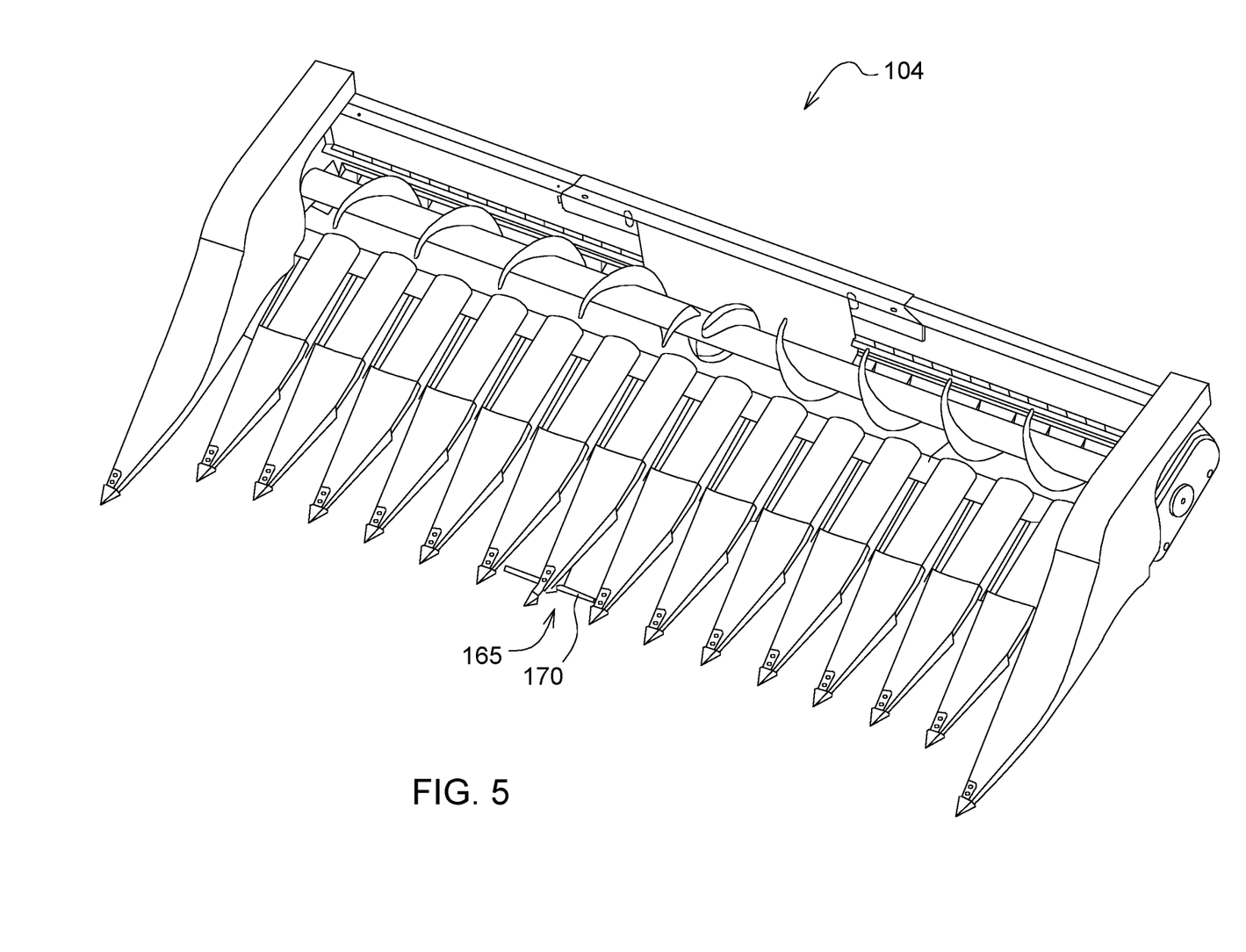
FIG. 5 is a perspective view of a portion of the agricultural work vehicle of the embodiment of FIG. 4.

Referring to FIGS. 3 and 5, the agricultural work vehicle 100 can include a crop feeler device 165. The crop feeler device 165 can include a rod 170 configured to contact a crop 175. The rod 170 can be made of material that is rigid or semi-rigid in order to minimize flexing so that the rod 170 moves in a linear fashion.

Figure 6:
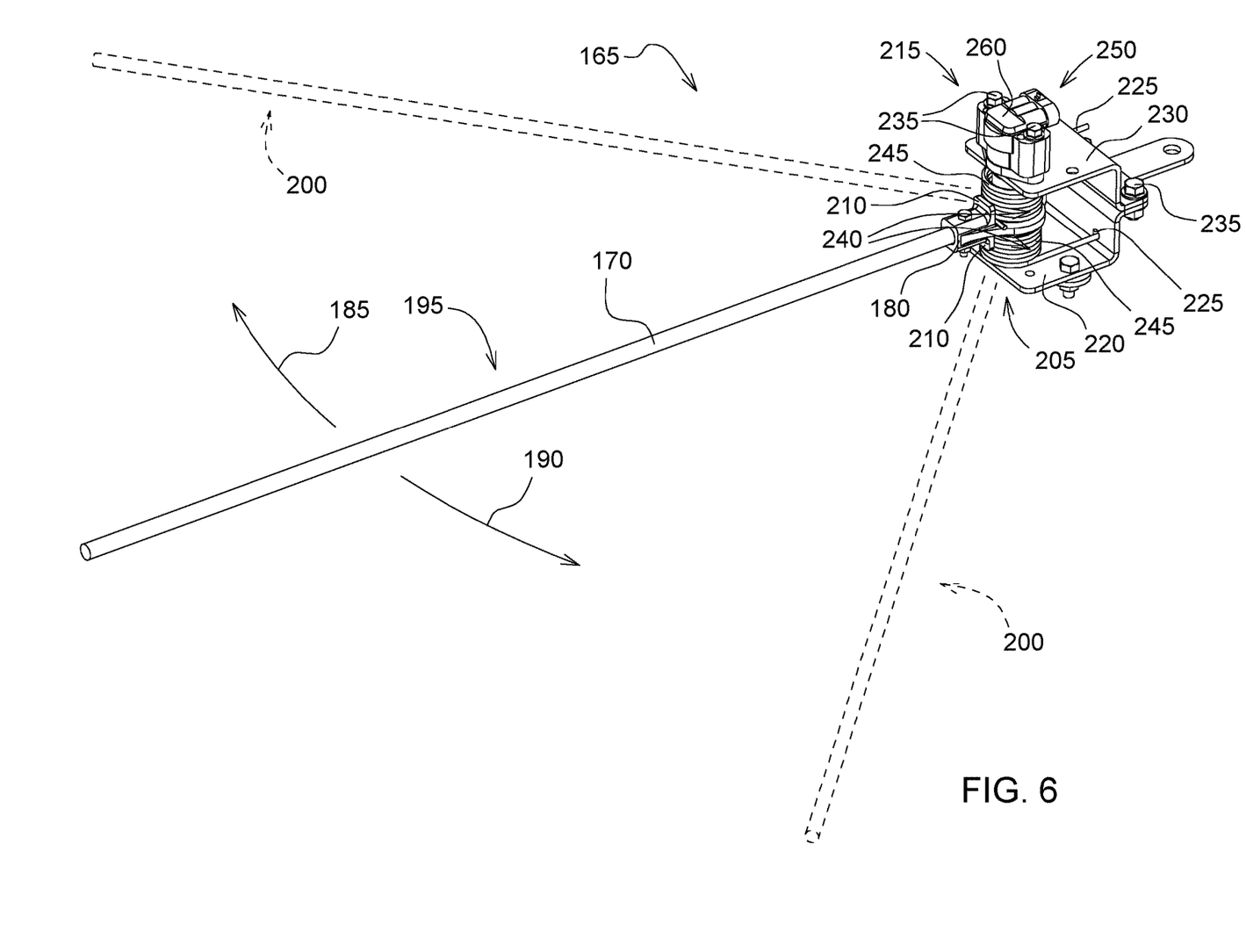
FIG. 6 is a perspective view of the crop feeler device of FIG. 3.
Figure 7:
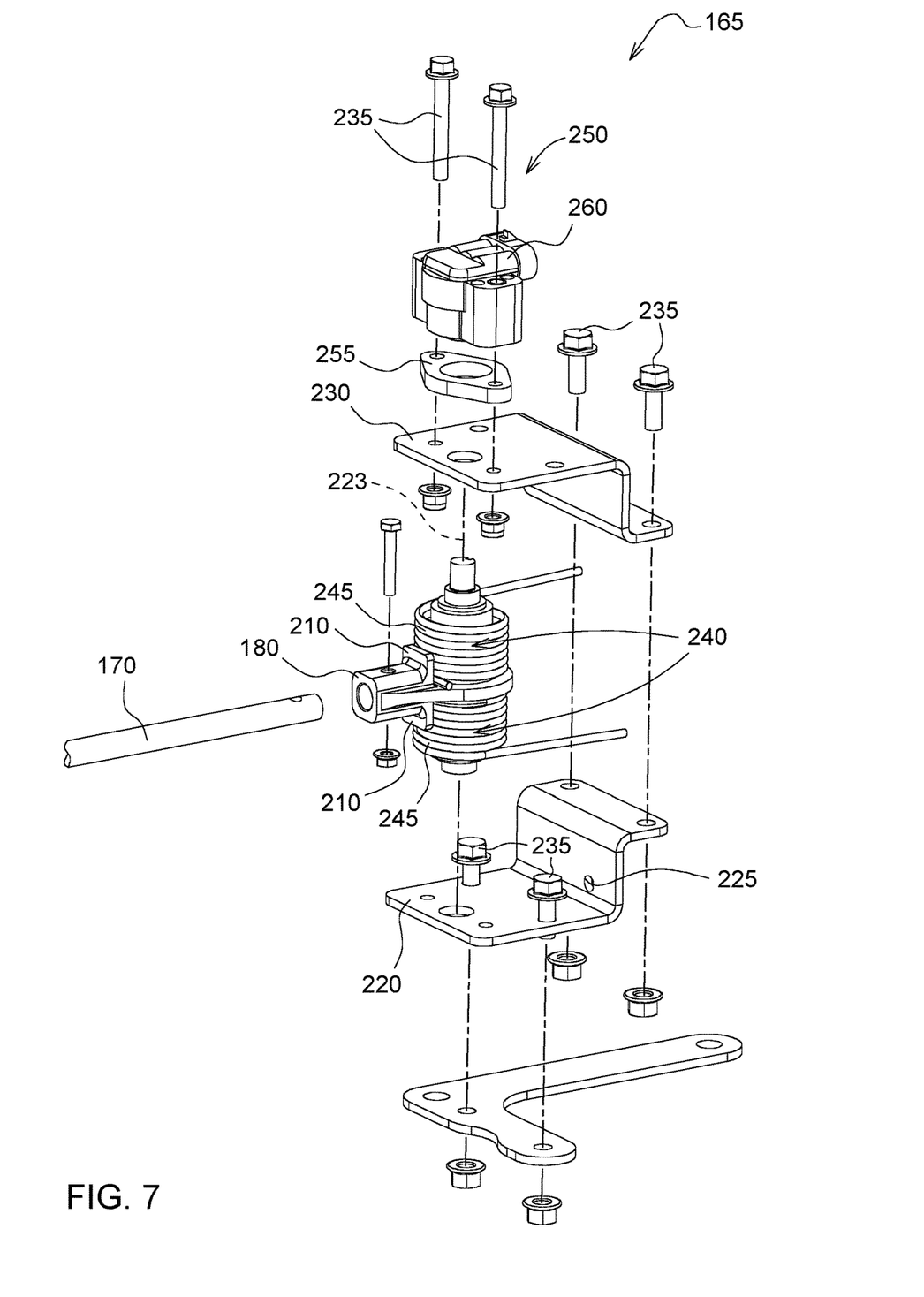
FIG. 7 is a partial exploded view of the crop feeler device of FIG. 3.

With reference to FIGS. 6 and 7, a pivot device 180 is coupled to the rod 170. The pivot device 180 is configured to pivot in two opposing directions 185, 190.

The pivot device 180 is configured to move from a central position 195, where the pivot device 180 is not pivoted, to a pivoted position 200, where the pivot device 180 is pivoted when the rod 170 is contacted by the crop 175 (FIG. 3). The pivot device 180 may comprise a hinge 205. The pivot device 180 may comprise a pair of stops 210.

A housing 215 is rotatably coupled to the pivot device 180. The housing 215 may be configured in various forms. The depicted housing 215 may comprise a bottom plate 220 that is positioned in a facing relationship with the pivot device 180. The bottom plate 220 is depicted in a mostly rectangular shape but may comprise other shapes. The housing 215 may comprise a pair of apertures 225.

The housing 215 may also comprise a top plate 230 that is positioned in a facing relationship with the pivot device 180. The top plate 230 is depicted in a mostly rectangular shape but may comprise other shapes. The bottom plate 220 and the top plate 230 may be coupled together with fasteners 235.

A pair of torsion devices 240 is positioned colinearly on an axis 223 of the pivot device 180. The torsion devices 240 may have one portion positioned against the stops 210 and another portion positioned in the apertures 225. The torsion devices 240 are configured to return the rod 170 to the central position 195 after a pivot of the pivot device 180. The torsion devices 240 can be a torsion spring 245 or other torsion device 240 that returns to its original position, or unwinds, after a twisting force or rotational force is no longer exerted on it. The torsion device 240 can be twisted and at least one torsion device 240 is more twisted in the pivoted position 200 than in the central position 195. The torsion devices 240 may be coupled to the pivot device 180 and coupled to one or more of the top plate 230 and the bottom plate 220.

A sensor 250 is positioned to measure a rotation of the pivot device 180 or the rod 170 as the rod 170 moves from the central position 195. The sensor 250 may be coupled to either the bottom plate 220 or the top plate 230 with fasteners 235. One or more gaskets or shims 255 may be positioned between the sensor 250 and the bottom plate 220 or the top plate 230. The sensor 250 may be a rotary sensor 260, which senses rotations.

The sensor 250 can provide an output that is linear with respect to movement of the rod 170 or the pivot device 180 due in part to the rigidity of the rod 170 and the overall design and configuration of the crop feeler device 165. The output linearity enables the sensor 250 to provide measurements of the work vehicle 100 relative to the crop 175 that can be used to more accurately control the work vehicle 100 because the distance from the work vehicle 100 to the crop 175 is more accurately reflected in the sensor 250 output.

Figure 8:
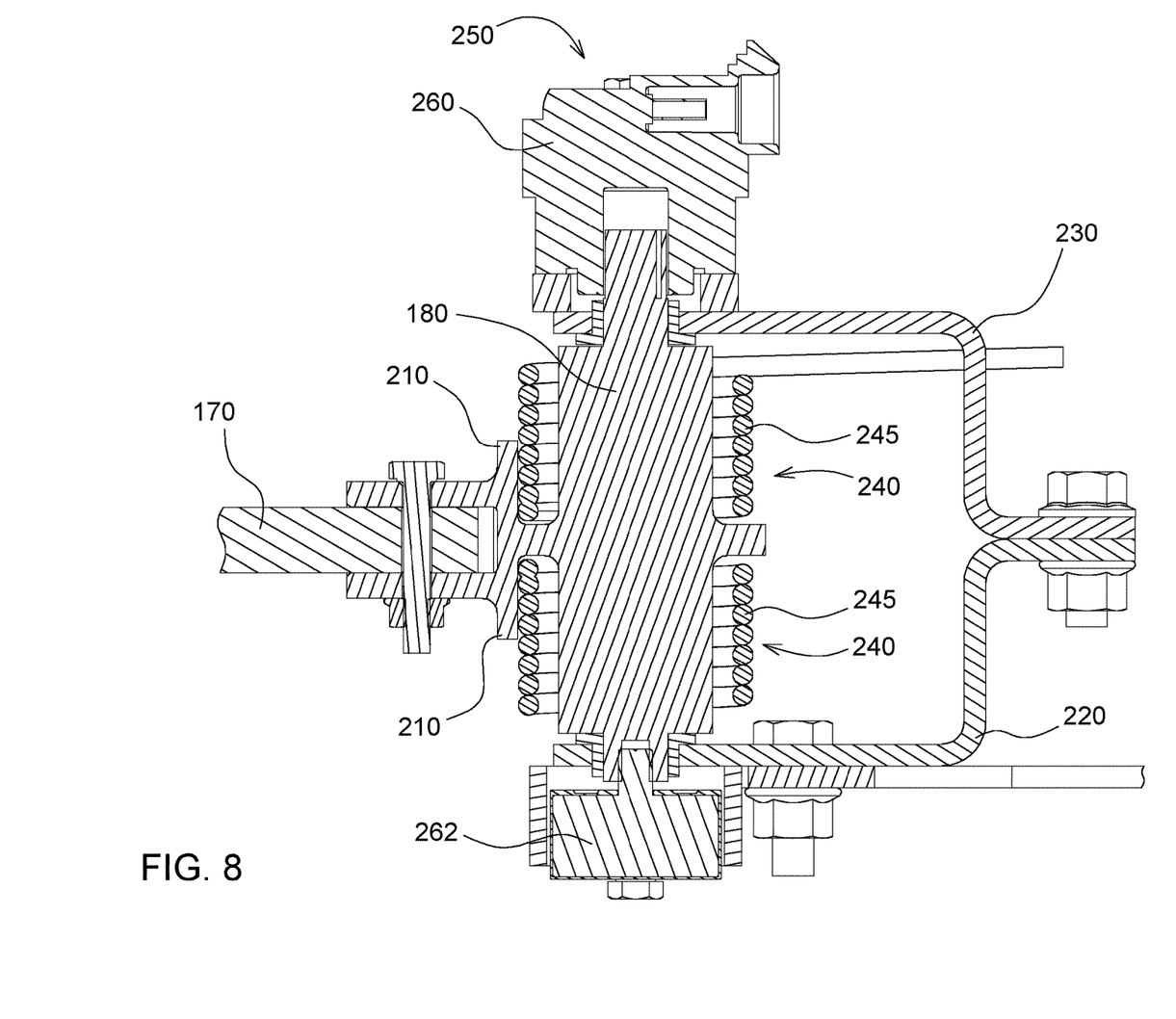
FIG. 8 is a partial sectioned view of a crop feeler device according to another embodiment.

Referring to FIG. 8, a torsion damper 262 may be coupled to the pivot device 180. The torsion damper 262 is configured to further smooth out the sensor 250 output and to reduce rod 170 flutter.

The agricultural work vehicle 100 may include an additional crop feeler device 165 positioned on a side of the agricultural work vehicle 100 opposite of the crop feeler device 165 positioned on another side of the agricultural work vehicle 100 as shown in FIG. 3. In this configuration, the crop feeler device 165 contacts the crop 175 in a first row 265 and the additional crop feeler device 165 contacts the crop 175 in a second row 270.

Figure 9:
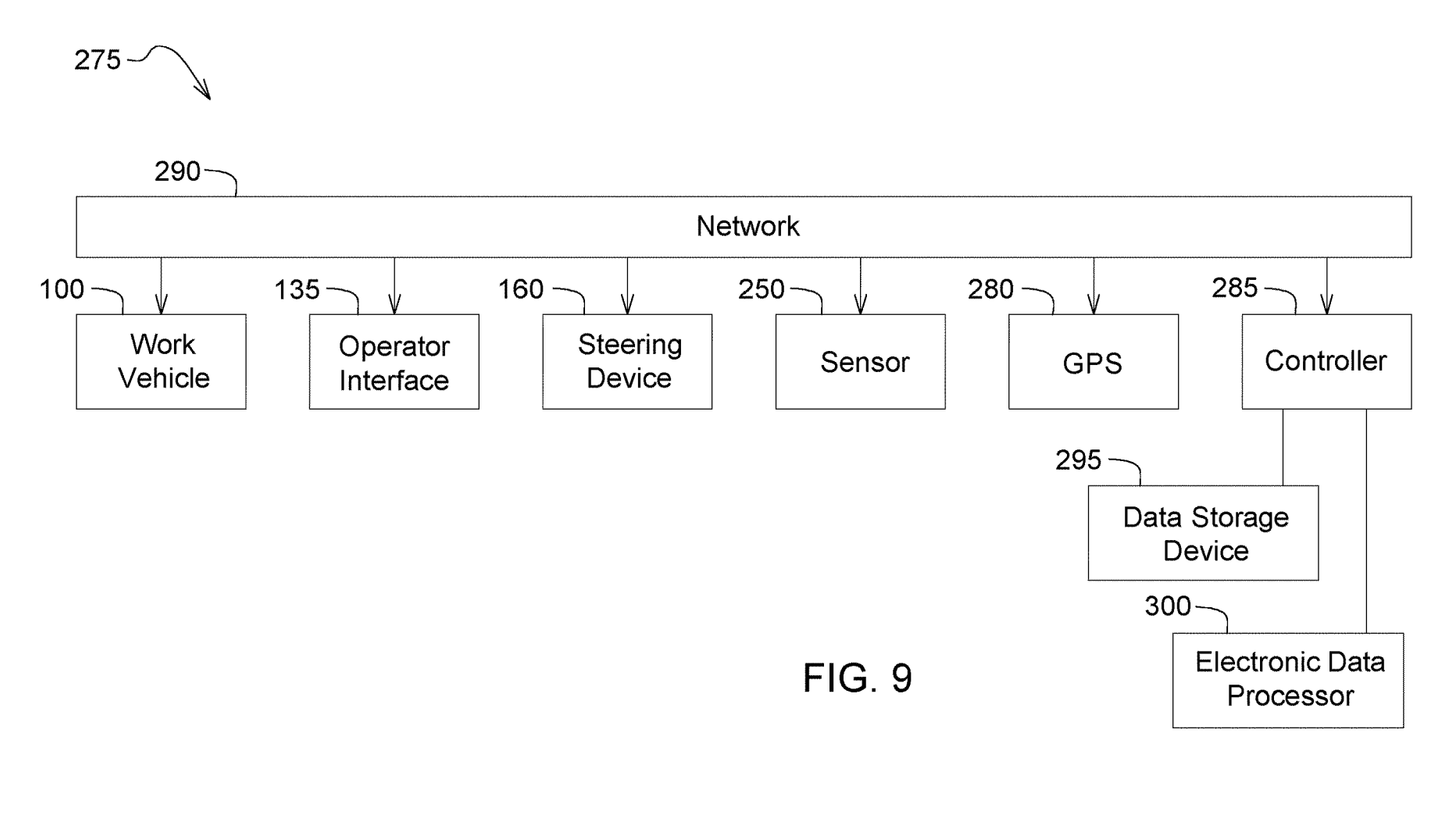
FIG. 9 is a block diagram of an agricultural work vehicle.

With reference to FIG. 9, a block diagram is provided of one example of a computing architecture 275 that includes the work vehicle 100, the sensor 250, a global positioning system ("GPS") 280, and a controller 285. The GPS 280 may comprise a Global Navigation Satellite System (GNSS), a terrestrial radio triangulation system, or any other system which is able to provide the location of the work vehicle 100 in a field in global or local coordinates. The work vehicle 100, the operator interface 135, the steering device 160, the sensor 250, the GPS 280, and the controller 285 are connected over a network 290. Thus, computing architecture 275 operates in a networked environment, where the network 290 includes any of a wide variety of different logical connections such as a local area network (LAN), wide area network (WAN), controller area network (CAN) near field communication network, satellite communication network, cellular networks, or a wide variety of other networks or combination of networks. It is also noted that the controller 285 can be deployed on the work vehicle 100 such that the controller 285 performs the operations described herein without a networked connection such as via a wired connection.

The controller 285 may comprise a data storage device 295 and an electronic data processor 300. The data storage device 295 can be configured for storing instructions that are executable by the electronic data processor 300 to cause the electronic data processor 300 to receive the signal, determine a steering output, and provide a steering signal to the steering device 160, or otherwise control the hydraulic cylinder 162, to steer the agricultural work vehicle 100 so that the ground engaging apparatus 115 contacts a minimum amount of crop 175 or the agricultural work vehicle 100 damages a minimum amount of crop 175. Alternatively, the steering output may be determined to steer the agricultural work vehicle 100 so that the deflection sensed by the sensor 250 of one or more crop feeler devices 165 is the same or minimized. An operator may make a settings selection using the operator interface 135. The settings selection may include sensor 250 sensitivity, how much the steering output should be affected by how far the rod 170 is deflected, or other.

Figure 10:
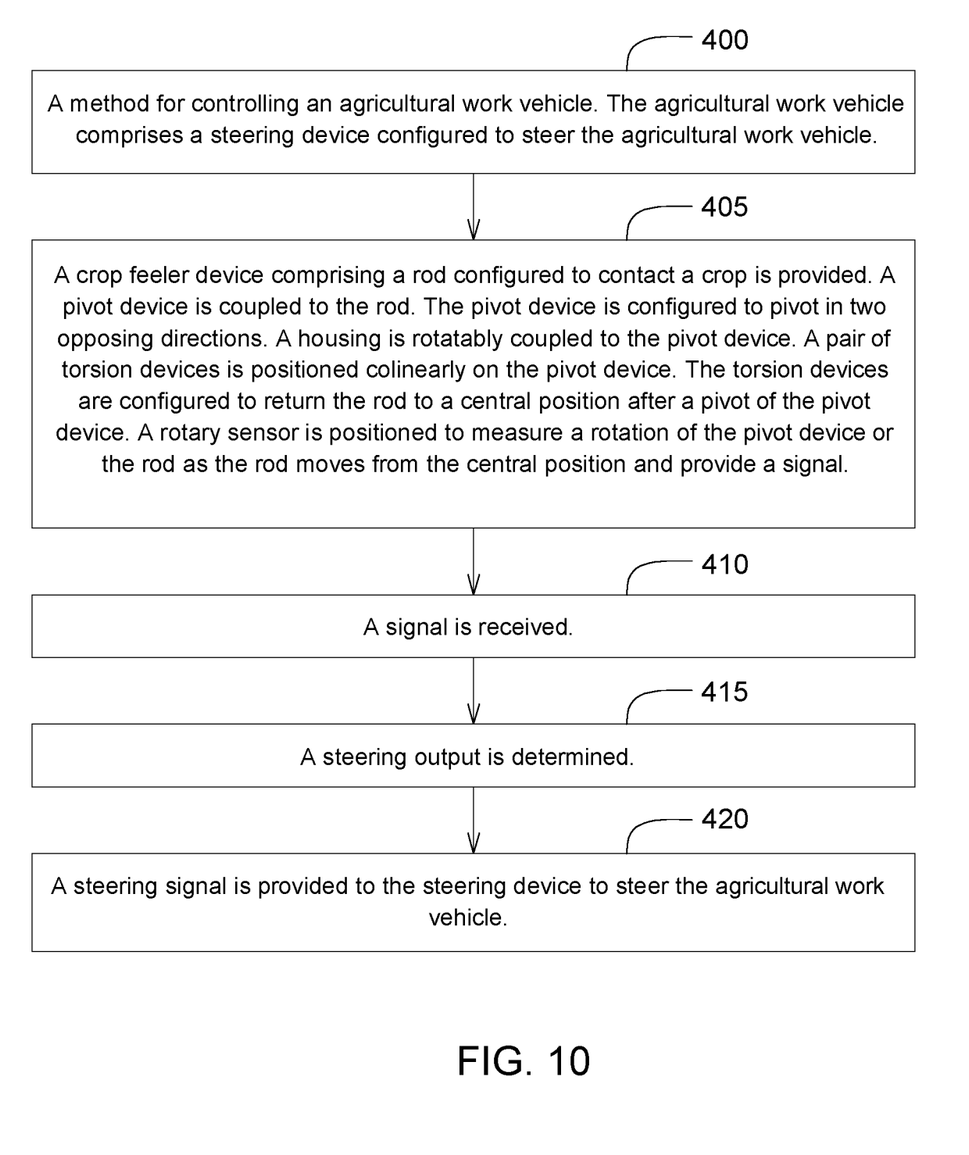
FIG. 10 is a flow diagram of a method of controlling the agricultural work vehicle.

With reference to FIG. 9, a flow diagram of a method 400 for controlling an agricultural work vehicle 100 is provided. The agricultural work vehicle 100 comprises a steering device 160 configured to steer the agricultural work vehicle 100.

At 405, a crop feeler device 165 comprising a rod 170 configured to contact a crop 175 is provided. A pivot device 180 is coupled to the rod 170. The pivot device 180 is configured to pivot in two opposing directions 185, 190. A housing 215 is rotatably coupled to the pivot device 180. A pair of torsion devices 240 is positioned colinearly on the pivot device 180. The torsion devices 240 are configured to return the rod 170 to a central position 195 after a pivot of the pivot device 180. A rotary sensor 260 is positioned to measure a rotation of the pivot device 180 or the rod 170 as the rod 170 moves from the central position 195 and provide a signal.

At 410 a signal is received. At 415, a steering output is determined. At 420, a steering signal is provided to the steering device 160 to steer the agricultural work vehicle 100.

Various features are set forth in the following claims.

What is claimed is:

1. A crop feeler device comprising:
   a rod;
   a pivot device coupled to the rod, the pivot device configured to pivot in two opposing directions;
   a housing rotatably coupled to the pivot device;
   a pair of torsion devices positioned colinearly on the pivot device, the torsion devices configured to return the rod to a central position after a pivot of the pivot device; and
   a rotary sensor positioned to measure a rotation of the pivot device or the rod as the rod moves from the central position, wherein the pivot device comprises a pair of stops and the housing comprises a pair of apertures and the pair of torsion devices each have one portion positioned against the stops and another portion positioned in the apertures.

2. The crop feeler device of claim 1, wherein the housing comprises a top plate and a bottom plate and the rotary sensor is coupled to the top plate or the bottom plate.

3. The crop feeler device of claim 1, wherein the pivot device rotates from the central position where the pivot device is not pivoted to a pivoted position where the pivot device is pivoted when the rod is contacted by a crop.

4. The crop feeler device of claim 3, wherein at least one of the torsion devices are twisted more in the pivoted position than in the central position.

5. The crop feeler device of claim 1, wherein the torsion devices comprise a torsion spring.

6. The crop feeler device of claim 1, wherein the torsion devices are coupled to one or more of the top plate and the bottom plate.

7. The crop feeler device of claim 1, wherein the sensor provides an output that is linear with respect to the movement of the rod or the pivot device.

8. An agricultural work vehicle comprising:
   a steering device configured to steer the agricultural work vehicle;
   a crop feeler device comprising:
     a rod;
     a pivot device coupled to the rod, the pivot device configured to pivot in two opposing directions;
     a housing rotatably coupled to the pivot device;
     a pair of torsion devices positioned colinearly on the pivot device, the torsion devices configured to return the rod to a central position after a pivot of the pivot device; and
     a rotary sensor positioned to measure a rotation of the pivot device or the rod as the rod moves from the central position; and
   a controller communicatively coupled to the rotary sensor, the controller comprising a data storage device and an electronic data processor, the data storage device configured for storing instructions that are executable by the electronic data processor to cause the electronic data processor to receive the signal, determine a steering output, and provide a steering signal to the steering device to steer the agricultural work vehicle, wherein the pivot device comprises a pair of stops and the housing comprises a pair of apertures and the pair of torsion devices each have one portion positioned against the stops and another portion positioned in the apertures.

9. The agricultural work vehicle of claim 8, wherein the housing comprises a top plate and a bottom plate and the rotary sensor is coupled to the top plate or the bottom plate.

10. The agricultural work vehicle of claim 9, wherein the torsion devices are coupled to one or more of the top plate and the bottom plate.

11. The agricultural work vehicle of claim 8, wherein the pivot device rotates from the central position where the pivot device is not pivoted to a pivoted position where the pivot device is pivoted when the rod is contacted by a crop.

12. The agricultural work vehicle of claim 11, wherein at least one of the torsion devices are twisted more in the pivoted position than in the central position.

13. The agricultural work vehicle of claim 8, wherein the torsion devices comprise a torsion spring.

14. The agricultural work vehicle of claim 8, wherein the sensor provides an output that is linear with respect to the movement of the rod or the pivot device.

15. The agricultural work vehicle of claim 8, wherein the steering device comprises a hydraulic cylinder.

16. The agricultural work vehicle of claim 8, further comprising an additional crop feeler device positioned on a side of the agricultural work vehicle opposite of the crop feeler device positioned on another side of the agricultural work vehicle.

17. The agricultural work vehicle of claim 16, wherein the crop feeler device contacts the crop in a first row and the additional crop feeler device contacts the crop in a second row.

18. A method for controlling an agricultural work vehicle, the agricultural work vehicle comprising a steering device configured to steer the agricultural work vehicle, the method comprising:
   providing a crop feeler device comprising a rod, a pivot device coupled to the rod, the pivot device configured to pivot in two opposing directions, a housing rotatably coupled to the pivot device, a pair of torsion devices positioned colinearly on the pivot device, the torsion devices configured to return the rod to a central position after a pivot of the pivot device, and a rotary sensor positioned to measure a rotation of the pivot device or the rod as the rod moves from the central position and provide a signal, wherein the pivot device comprises a pair of stops and the housing comprises a pair of apertures and the pair of torsion devices each have one portion positioned against the stops and another portion positioned in the apertures; and
   receiving the signal;
   determining a steering output; and
   providing a steering signal to the steering device to steer the agricultural work vehicle.

* * * * *